(12) United States Patent
Tunes

(10) Patent No.: US 11,540,459 B2
(45) Date of Patent: Jan. 3, 2023

(54) PLANT HOLDER AND METHOD

(71) Applicant: Susan Tunes, Hillsboro, OR (US)

(72) Inventor: Susan Tunes, Hillsboro, OR (US)

( * ) Notice: Subject to any disclaimer, the term of this patent is extended or adjusted under 35 U.S.C. 154(b) by 15 days.

(21) Appl. No.: 17/156,360

(22) Filed: Jan. 22, 2021

(65) Prior Publication Data

US 2022/0232784 A1 Jul. 28, 2022

(51) Int. Cl.
*A01G 27/02* (2006.01)
*A01M 29/34* (2011.01)
*A01G 9/02* (2018.01)

(52) U.S. Cl.
CPC .............. *A01G 27/02* (2013.01); *A01G 9/028* (2013.01); *A01M 29/34* (2013.01); *A01M 2200/012* (2013.01)

(58) Field of Classification Search
CPC .......... A01G 9/028; A01G 9/02; A01G 27/02; A01G 27/06; A01G 2009/003; A01M 29/34; A01M 2200/012
USPC .......................................................... 47/79
See application file for complete search history.

(56) References Cited

U.S. PATENT DOCUMENTS

| | | | | |
|---|---|---|---|---|
| 1,495,594 A * | 5/1924 | Hutchins | ................. | A47J 27/04 99/410 |
| 1,533,342 A * | 4/1925 | Schein | ..................... | A01G 9/02 211/67 |
| 2,110,059 A * | 3/1938 | Brimm | .................... | E21B 27/00 47/79 |
| 2,492,152 A * | 12/1949 | Hollowell | ............... | A01G 27/00 47/79 |
| 3,137,096 A * | 6/1964 | Hopkins | ................. | A01G 27/00 47/79 |
| 3,534,498 A * | 10/1970 | Herrli | ..................... | A01G 27/06 47/81 |
| 4,106,235 A * | 8/1978 | Smith | ..................... | A01G 31/02 47/66.2 |
| 5,806,242 A * | 9/1998 | Park | ........................ | A01G 27/06 47/79 |
| D445,358 S * | 7/2001 | Simmons | ..................... | D11/152 |
| 6,266,919 B1 * | 7/2001 | Hoium, Jr. | .............. | A01G 9/028 206/510 |
| 6,412,740 B1 * | 7/2002 | Rush | ........................ | A47G 7/02 248/312.1 |
| 9,668,428 B1 * | 6/2017 | Frame | ...................... | A01G 9/02 |
| 2002/0005011 A1 * | 1/2002 | Goldberg | ............... | A01G 9/028 47/65.5 |
| 2002/0017058 A1 * | 2/2002 | Chung | ................... | A01G 27/06 47/79 |
| 2006/0112632 A1 * | 6/2006 | Mori | ...................... | A01G 27/02 47/79 |

(Continued)

FOREIGN PATENT DOCUMENTS

| | | | | |
|---|---|---|---|---|
| GB | 2241860 A | * | 9/1991 | ........... A01G 27/003 |
| WO | WO-9419928 A1 | * | 9/1994 | ............. A01G 27/04 |

*Primary Examiner* — Brady W Frazier
*Assistant Examiner* — Zoe Tam Tran
(74) *Attorney, Agent, or Firm* — Fish & Richardson P.C.

(57) ABSTRACT

This disclosure relates to a planter device, and in some implementations, a planter for providing water to a plant and its method of use. The planter device may optionally include a double-walled vessel comprising a plurality of supporting sidewalls. In some embodiments, the inner and outer supporting sidewalls may be connected to one another by a supporting bridge.

14 Claims, 4 Drawing Sheets

(56) References Cited

U.S. PATENT DOCUMENTS

2006/0207175 A1* 9/2006 Wu .................. A01G 27/02
47/79

* cited by examiner

PLANT HOLDER AND METHOD

TECHNICAL FIELD

This disclosure relates to a plant holder, and in some implementations, a planter for providing water to a plant and its method of use.

BACKGROUND

Planters are useful devices for retaining plants of various types, supporting them, and in some instances providing a basin of water for the plant. Planters may retain plants for a variety of reasons, including for decorative purposes around the home, for growing of vegetables, or providing food for local wildlife. Planters may also be used for a number of other utilitarian applications. As one example, planters supporting carnivorous plant may be used as a method of controlling the population of flies in areas where flies congregate, such as in barns or around other livestock. Some types of plants, including for example, carnivorous plants and water lilies, have a significant requirement for water in order to grow. As such, various planters may provide a basin for water for the plant to draw from to reduce the frequency at which additional water must be added to the planter and to ensure sufficient water is present for adequate plant health and growth. However, in some cases, the presence of an open water basin can provide a breeding ground for other pests, such as mosquito larvae, which may prove undesirable, particularly if the planter is located close to humans or other animals. To reduce the availability of open water for mosquito larvae, certain planters may include a moisture wicking system to draw water from a basin to the plant, but for water-hungry plants this may not provide adequate moisture for growth and overall plant health.

SUMMARY

Some embodiments described herein include an improved plant holder that provides a reservoir of water for a plant in order to allow water heavy plants enough water to thrive while reducing the ability of mosquitoes and other pests to access the reservoir of water. For example, the improved plant holder may optionally include a double-walled vessel comprising a plurality of supporting sidewalls. In some embodiments, the plurality of supporting sidewalls may comprise an exterior sidewall connected to a base where the exterior sidewall has an axial height. In some implementations, the plurality of supporting sidewalls may comprise an interior sidewall having an axial height that is axially aligned with the exterior sidewall.

In some embodiments, the inner and outer supporting sidewalls may be connected to one another by a supporting bridge. Optionally, the supporting bridge may be located proximate the lower end of the inner supporting sidewall, but proximate the middle of the outer supporting sidewall. In this manner, a reservoir for water is provided below the inner supporting sidewall. Optionally, the upper edge of the inner supporting sidewall may be configured to support a plant or a plant holder, such that the lower end of the plant, planter containing the plant, or the plant roots extends down through the inner sidewall and rests in water reservoir. In optional embodiments, the space between the inner and outer supporting sidewalls above the supporting bridge may be sized so as to provide a space for the placement of rocks, pebbles, or other decorative material.

In certain embodiments, the supporting bridge may comprise a plurality of apertures. In such embodiments, water that is poured between the first and second supporting sidewalls from above will flow through the apertures and fill the water reservoir below, thereby filling the reservoir while avoiding pouring water directly onto a plant that may be placed on and within the inner supporting sidewall. Optionally, the apertures in the supporting bridge may be provided with mesh, screens, or other material to allow for the passage of water but to reducing the ability of pebbles, dirt, or mosquitos from entering the water reservoir.

In some embodiments of the improved plant holder, the outer supporting sidewall may be provided with one or more apertures located proximate the position where the supporting bridge connects with the outer supporting sidewall, in order to provide a drain hole for excess water. In such embodiments, if a threshold amount of water is poured between the inner and outer supporting sidewalls to fill the water reservoir, any excess water may pour out the drain hole in the outer sidewall. This may reduce the chance of excess water continuing to fill the space between the inner and outer supporting sidewalls, and providing a potential breeding ground for mosquito larvae or other pests.

Particular embodiments described herein include a plant holder having an outer sidewall extending upwardly from a base to at least partially define a fluid reservoir for retaining water inwardly of the outer sidewall. Optionally, the plant holder may also include an inner sidewall extending upwardly to retain a plant and being positioned inwardly of the outer sidewall at an elevated position above the base such that a lower end of the inner sidewall is spaced above the base. In particular embodiments, the plant holder may further comprise a fluid aperture bridge positioned within the outer sidewall above the base and extending inwardly from the outer sidewall to mechanically support the inner sidewall at said elevated position spaced above the base, the fluid aperture bridge defining a plurality of fluid flow apertures extending between the fluid reservoir defined between the base and the fluid aperture bridge and a cavity defined between the outer sidewall and the inner sidewall.

Other embodiments described herein may comprise a system for retaining a plant. The system may optionally include a plant holder comprising a base defining a central vertical axis and a first sidewall surrounding the central vertical axis and having an axial height extending upwardly from the base. In some embodiments, the system further includes a second sidewall surrounding the central vertical axis and being axially aligned the first sidewall, wherein the second sidewall is positioned inwardly of the first sidewall at an elevated position above the base such that a lower end of the second sidewall is spaced above the base. Optionally, the system may further comprise a fluid aperture bridge positioned within the first sidewall above the base and extending inwardly from the first sidewall to mechanically support the second sidewall at said elevated position spaced above the base, the fluid aperture bridge defining a plurality of fluid flow apertures extending between a fluid reservoir defined between the base and the fluid aperture bridge and a cavity defined between the first sidewall and the second sidewall. In particular implementations, the system may further include a plant supported by the second sidewall such that a lowermost end of the plant is positioned above the base and spaced inwardly from the first sidewall.

Some embodiments described herein include a method of watering a plant comprising inserting a plant into an interior space at least partially defined by an inner sidewall of a plant holder such that a lowermost end of the plant is positioned above a base of the plant holder and spaced inwardly from an outer sidewall of the plant holder that surrounds both the inner sidewall and a central vertical axis of the base. In some embodiments, the method may further include delivering water between the first and second sidewall such that water contacts a fluid aperture bridge of the plant holder positioned within the outer sidewall above the base and extending inwardly from the outer sidewall at a position above the base to mechanically support the inner sidewall at an elevated position spaced above the base, wherein said water flows from a cavity defined between the outer sidewall and the inner sidewall, through a plurality of fluid flow apertures defined by the fluid aperture bridge, and into a fluid reservoir defined between the base and the fluid aperture bridge.

A number of embodiments described herein may provide one or more of the following advantages. First, some embodiments provide a double-walled planter with an inner and outer supporting sidewall connected by a supporting bridge. In certain implementations, the inner supporting sidewall is shorter than the outer supporting sidewall, and the supporting bridge is connected proximate the lower end of the inner supporting sidewall, thereby providing a water reservoir underneath the inner supporting sidewall. As such, the plant holder can advantageously retain a plant within the inner supporting sidewall and allow the plant access to the water reservoir, thereby providing an ample supply of water to the plant. Second, some optional embodiments of the plant holder can include one or more apertures in the supporting bridge to allow water to pass through the bridge and fill the water reservoir. In particular implementations, the apertures may be fitted with mesh or other blocking material so as to allow the passage of water into the water reservoir but reduce the ability of pebbles, dirt, or mosquitos to access the water reservoir. Third, some embodiments of the plant holder can be equipped with a drain hole in the outer supporting sidewall proximate the supporting bridge so as to allow excess water to drain out of the area between the inner and outer supporting sidewall, thereby reducing the chance that mosquitos or other pests may gain access to water in the plant holder. As such, some versions and uses of the plant holder can advantageously provide sufficient water for a plant, such as water-hungry plants like bog plants or carnivorous plants, while reducing the ability of mosquitos and other pests to access the water reservoir.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
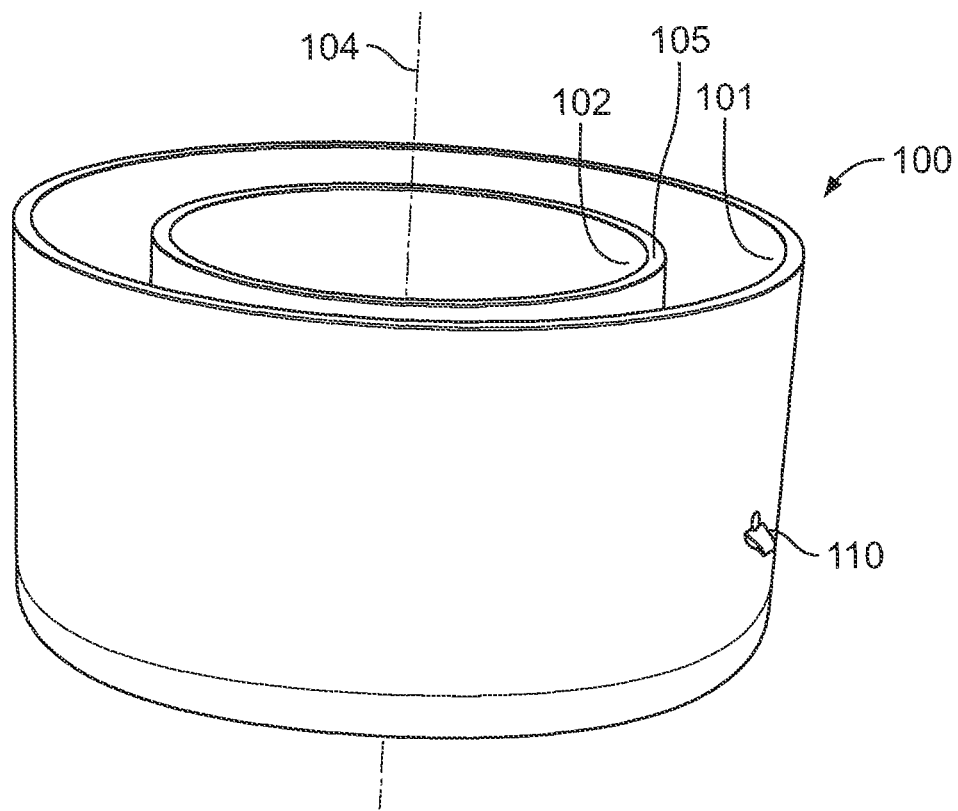
FIG. 1 shows a perspective view of an improved plant holder.

Referring now to FIG. 1, some embodiments of a plant holder 100 are configured to support a plant or planter pot (which can contain the plant). The plant holder 100 includes sidewalls 101 and 102. Sidewall 101 extends upwardly from a base 205 (FIG. 2), and sidewall 102 is supported at an elevated position above the base. In some embodiments, supporting sidewalls 101 and 102 both surround a central vertical axis 104, which in this embodiment is defined by the base, and supporting sidewalls 101 and 102 can be axially aligned with one another. Optionally, sidewall 102 may be located entirely within the area formed by sidewall 101 from a plan perspective.

In certain embodiments, such as shown in FIG. 1, sidewalls 101 and 102 may each define an interior space having a circular cross section, or in other embodiments the first and second sidewalls 101 and 102 may define interior spaces having other cross-sectional shapes, such as a square interior space, a rectangular interior space, a hexagonal interior space, or a non-polygonal interior space. The top surface of the second (inner) sidewall 102 may be configured in some embodiments with a lip 105 or other beveled surface to allow a plant or potted plant to rest against the upper surface of sidewall 102 (refer, for example, to FIGS. 5 and 6). In some embodiments, the first sidewall 101 may comprise an aperture extending to an exterior of sidewall 101 so as to provide drain 110 from a cavity 220 (FIG. 2) located between the first and second sidewalls 101 and 102.

In particular implementations, sidewall 101 may be fitted with a number of mounting apertures through sidewall 101 (not shown). For example, in some embodiments, a user may use such apertures to attach hooks, string, or other media so as to hang plant holder 100 from another structure, such as a roof, awning, hook, or similar device.

Figure 2:
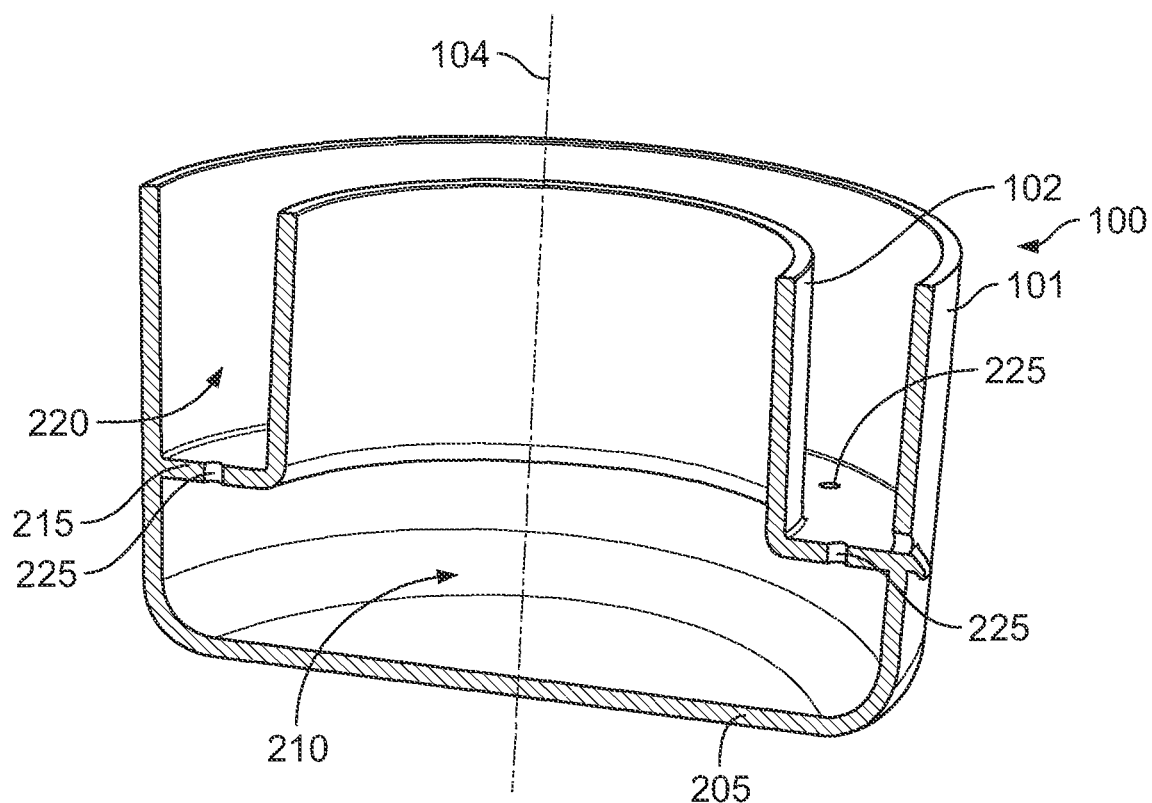
FIG. 2 shows a cross-sectional view of the improved plant holder of FIG. 1.
Figure 3:
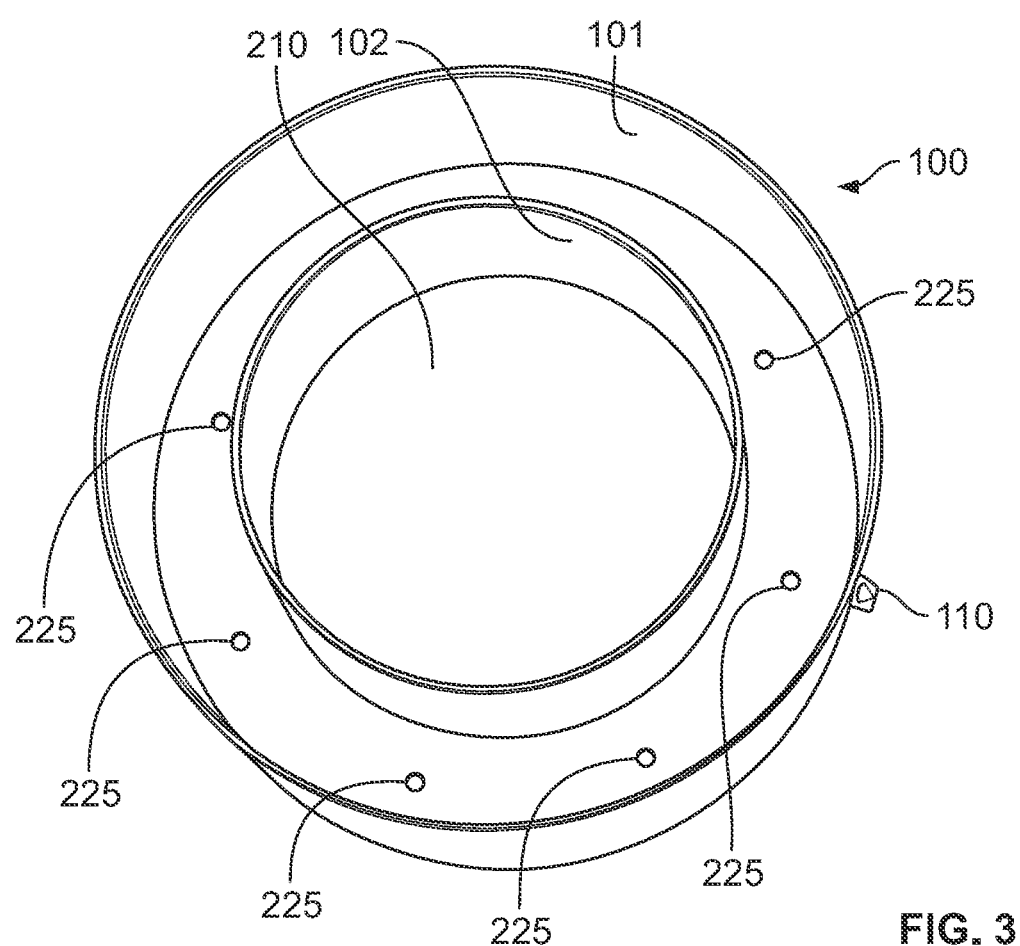
FIG. 3 shows an alternative perspective view from above of the improved plant holder of FIG. 1.

Referring now to FIG. 2, a cross sectional view of plant holder 100 is shown. FIG. 3 shows a top-down perspective view of plant holder 100, showing many of the same features as illustrated in FIG. 2. As shown in FIG. 2, sidewall 102 is sized to be vertically shorter than sidewall 101 such that sidewall 102 extends only a part of the distance from the upper end of sidewall 101 toward the lower end of sidewall 101 (which joins with the base in this embodiment). In other embodiments, sidewall 102 may be located with its upper edge above or below the upper edge of sidewall 101. Referring again to FIG. 2, sidewall 101 is connected to base 205 so as to form water reservoir 210 underneath the lowermost end of sidewall 102. Although sidewall 102 is shown extending approximately 65% of the distance from the top of sidewall 101 to the bottom, in other embodiments sidewall 102 may have a vertical height of 10% to 90% of the vertical height of sidewall 101.

Still referring to FIG. 2, in some embodiments, supporting bridge 215 is joined on one side to the lower end of sidewall 102, and on the other end, to an interior of sidewall 101. In this manner, supporting bridge 215, along with sidewalls 101 and 102, forms cavity 220 above supporting bridge 215 and between sidewalls 101 and 102. In some embodiments, a user may fill cavity 220 with rocks, pebbles, or other decorative material. In such embodiments, the presence of supporting bridge 215 will keep the rocks, pebbles, or other decorative material from falling into water reservoir 210.

In particular embodiments, supporting bridge 215 may have one or more apertures 225 that extend through the body of supporting bridge 215, as shown in FIG. 2. Apertures 225 allow a user to pour water into cavity 220 whereby that water will flow down through apertures 225 and into water reservoir 210. In certain embodiments, this allows the user to fill water reservoir 210 without having to remove the plant or potted plant that is placed on or within sidewall 102. In some embodiments, apertures 225 may be fitted with mesh, screens, or other blocking material (not shown), so as to permit the passage of water into water reservoir 210, but to reduce the transmission of other materials (e.g., rocks, pebbles, dirt, or mosquitos and other bugs) into water reservoir 210.

Figure 4:
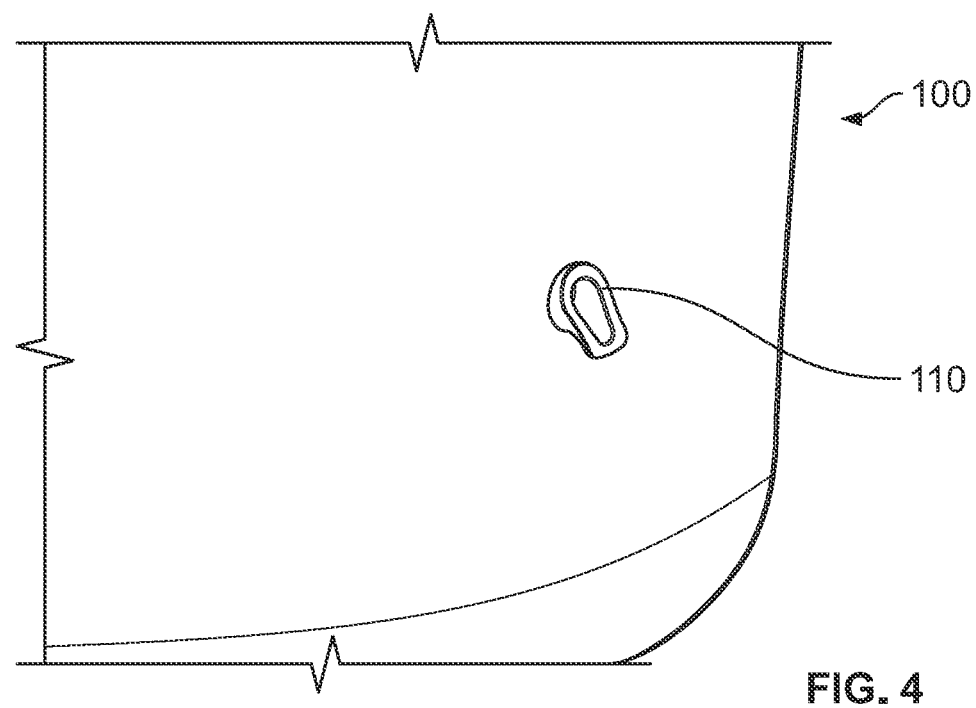
FIG. 4 shows another perspective view of a portion of a side of the improved plant holder of FIG. 1.

As shown in FIGS. 2, 3, and 4, in certain embodiments, plant holder 100 may further comprise a drain in sidewall 101 in the form of an aperture passing through the wall of sidewall 101. Although FIGS. 2-4 illustrate a single drain, other embodiments may comprise a plurality of such drains. In particular embodiments, such as those shown in FIGS. 2-4, drain 110 may be located proximate the location where bridge 215 connects with the inner side of sidewall 101. For example, the drain 110 may include an opening that extends along a plane of the bridge (e.g., parallel to an uppermost surface of the 215) and through a wall of the sidewall 101. In this manner, when a user adds water to cavity 220, to the extent the water level rises above a level defined by an uppermost surface of the bridge 215, the water may be diverted to flow out of drain 110, rather than continuing to fill cavity 220 beyond the height of the drain 110. In other embodiments, drain 110 may be located higher along an axial height of sidewall 101 with respect to bridge 215 but below a rim of sidewall 101, or may be lower along an axial height of sidewall 101 with respect to bridge 215 but above the base 205.

Figure 5:
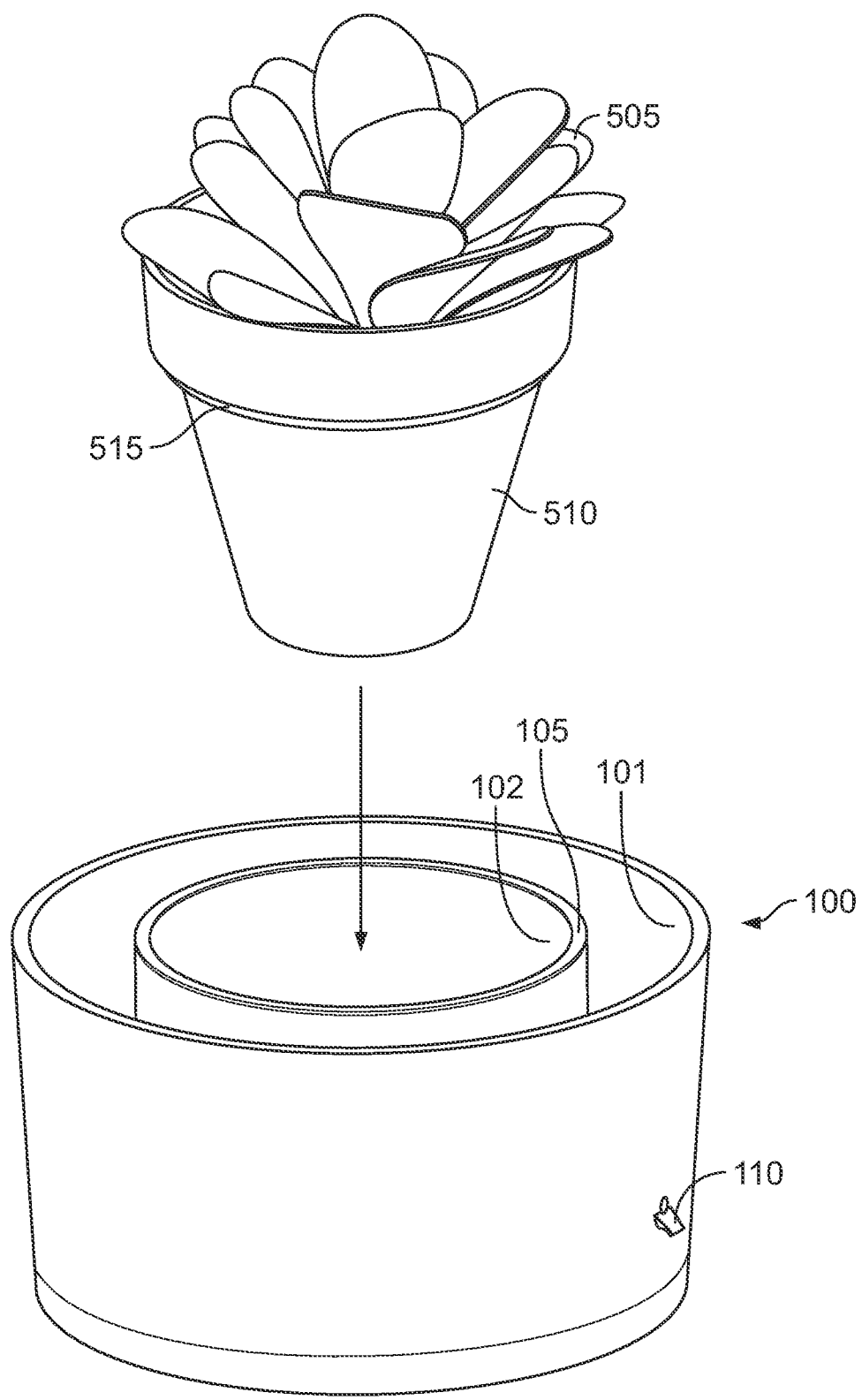
FIG. 5 shows the improved plant holder of FIG. 1 with a potted plant above the plant holder.
Figure 6:
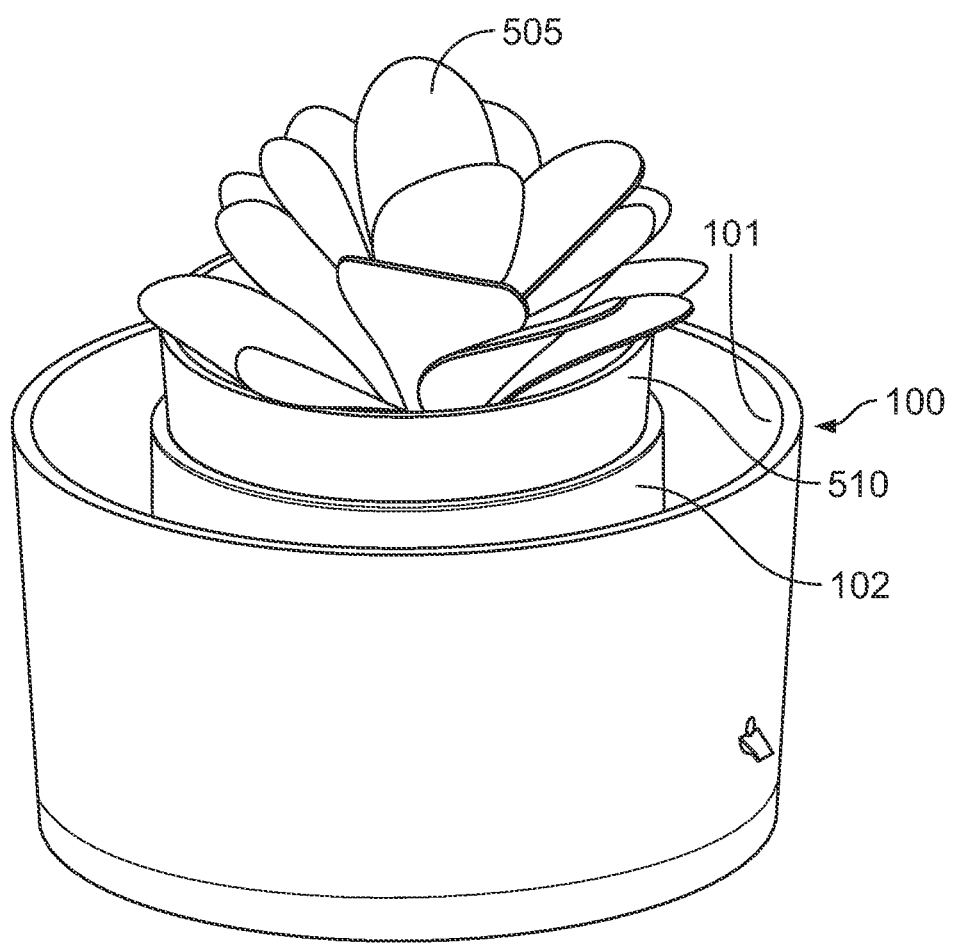
FIG. 6 shows the improved plant holder of FIG. 1 with a potted plant inserted into the plant holder.

As shown in more detail with respect to FIGS. 5 and 6, some embodiments may include a system comprising improved plant holder 100 and plant 505. As shown in FIG. 5, in some implementations, plant 505 may be inserted into planter 510. A user may then optionally insert planter 510 (containing plant 505) into the opening formed by sidewall 102 such that lip 515 of planter 510 will rest against lip 105 of sidewall 102 to provide support and to retain planter 510 (as is shown in more detail in FIG. 6). In some embodiments, the lower end of planter 510 will extend through the cavity formed by sidewall 102 such that the lower end of planter 510 contacts or enters into water reservoir 210, such that water may be provided to plant 505. Preferably, sidewall 102 and planter 510 will be sized such that when lip 515 of planter 510 is in contact with lip 105 of sidewall 102 the lower end of planter 510 is above base 205.

In other embodiments, planter 510 may be omitted. In some such implementations, sidewall 102 may be further fitted with an apparatus for supporting plant 505 (not shown). For example, in some implementations, sidewall 102 may contain plant support rods extending between the inner surfaces of sidewall 102. Optionally, such plant support rods may be located proximate the lower end of sidewall 102, or in other embodiments, such plant support rods may be located at another axial height below lip 105.

In use, the embodiments depicted in FIGS. 1-6 can be used by a user to support and provide water to a plant while reducing the ability of mosquitos to access the water held in plant holder 100.

In one example, during operation, a user may place a plant 505 or planter 510 into the cavity formed by sidewall 102. The user may then optionally pour water into cavity 220 so as to fill water reservoir 210 with water (by flowing through apertures 225 in bridge 215) and provide water for plant 505. If the user pours sufficient water into cavity 220 so as to fill water reservoir 210, any additional or excess water poured by the user may, in some embodiments, flow out of plant holder 100 through drain 230. In some embodiments, the user may fill cavity 220 with rocks, pebbles, or other material.

A number of embodiments have been described. Nevertheless, it will be understood that various modifications may be made without departing from the scope of the following claims.

What is claimed is:

1. A plant holder comprising:
   an outer sidewall extending upwardly from a base to at least partially define a fluid reservoir for retaining water inwardly of the outer sidewall, wherein the base has a solid upper surface that extends inwardly from the outer sidewall toward a central vertical axis of the base;
   an inner sidewall extending upwardly to retain a plant and being positioned inwardly of the outer sidewall at an elevated position above the base such that a lower end of the inner sidewall is spaced above the base;
   a fluid aperture bridge positioned within the outer sidewall above the base and extending inwardly from the outer sidewall to mechanically support the inner sidewall at said elevated position spaced above the base, the fluid aperture bridge defining a plurality of fluid flow apertures extending between the fluid reservoir defined between the base and the fluid aperture bridge and a cavity defined between the outer sidewall and the inner sidewall; and
   a drain aperture extending from the cavity to an exterior of the outer sidewall in a direction transverse to the central vertical axis of the base and being located adjacent to an upper surface of the fluid aperture bridge.

2. The plant holder of claim 1, wherein each of the outer sidewall and inner sidewall defines a hexagonal interior space.

3. The plant holder of claim 1, wherein each of the outer sidewall and inner sidewall defines a rectangular interior space.

4. The plant holder of claim 1, wherein each of the outer sidewall and inner sidewall defines a circular interior space.

5. The plant holder of claim 1, wherein the outer sidewall, the inner sidewall, and the fluid aperture bridge are a unitary structure.

6. The plant holder of claim 5, wherein an upper end of the outer sidewall is positioned at a same height above the base as an upper end of the inner sidewall above the base.

7. The plant holder of claim 6, further comprising a planter pot removably seated within the inner sidewall such that the planter pot slidably engages the inner sidewall while being spaced inwardly from the outer sidewall.

8. A system for retaining a plant, comprising:
   a plant holder comprising:
      a base defining a central vertical axis;
      a first sidewall surrounding the central vertical axis and having an axial height extending upwardly from the base;
      a second sidewall surrounding the central vertical axis and being axially aligned with the first sidewall, wherein the second sidewall is positioned inwardly of the first sidewall at an elevated position above the base such that a lower end of the second sidewall is spaced above the base;
      a fluid aperture bridge positioned within the first sidewall above the base and extending inwardly from the first sidewall to mechanically support the second sidewall at said elevated position spaced above the base, the fluid aperture bridge defining a plurality of fluid flow apertures extending between a fluid reservoir defined between the base and the fluid aperture bridge and a cavity defined between the first sidewall and the second sidewall;

a drain aperture adjacent an upper surface of the fluid aperture bridge, the drain aperture extending from the cavity to an exterior of the outer sidewall in a direction transverse to a central vertical axis of the base; and a plant supported by the second sidewall such that a lowermost end of the plant is positioned above the base and spaced inwardly from the first sidewall.

9. The system of claim 8, wherein the plant is seated within a planter pot having a supporting lip that is removably engaged with an upper end of the second sidewall.

10. The system of claim 8, wherein each of the first and second sidewalls defines one of a hexagonal interior space, a rectangular interior space, and a circular interior space.

11. A method of watering a plant, comprising:

inserting a plant into an interior space at least partially defined by an inner sidewall of a plant holder such that a lowermost end of the plant is positioned above an upper continuous surface of a base of the plant holder and spaced inwardly from an outer sidewall of the plant holder that surrounds both the inner sidewall and the upper continuous surface of the base; and delivering water between the inner and outer sidewall such that water contacts a fluid aperture bridge of the plant holder positioned within the outer sidewall above the base and extending inwardly from the outer sidewall at a position above the base to mechanically support the inner sidewall at an elevated position spaced above the base, wherein said water flows from a cavity defined between the outer sidewall and the inner sidewall, through a plurality of fluid flow apertures defined by the fluid aperture bridge, and into a fluid reservoir defined between the base and the fluid aperture bridge, wherein the plant holder further comprises a drain aperture that is adjacent an upper surface of the fluid aperture bridge and extends from the cavity to an exterior of the outer sidewall.

12. The method of claim 11, wherein each of the outer sidewall and inner sidewall defines one of a hexagonal interior space, a rectangular interior space, and a circular interior space.

13. The method of claim 12, wherein said inserting the plant includes inserting a planter pot that contains the plant into removable engagement with the inner sidewall.

14. The method of claim 13, wherein the planter pot includes a supporting lip that is removably seated upon an upper end of the inner sidewall.

* * * * *